United States Patent [19]

Sasaki et al.

[11] Patent Number: 5,110,872

[45] Date of Patent: May 5, 1992

[54] RUBBER COMPOSITION

[75] Inventors: Makoto Sasaki, Yokohama; Yukio Kobayashi; Shozo Tsuchiya, both of Tokyo, all of Japan

[73] Assignee: Nippon Oil Co., Ltd., Japan

[21] Appl. No.: 254,939

[22] PCT Filed: Dec. 23, 1987

[86] PCT No.: PCT/JP87/01020

§ 371 Date: Aug. 26, 1988

§ 102(e) Date: Aug. 26, 1988

[87] PCT Pub. No.: WO88/05063

PCT Pub. Date: Jul. 14, 1988

[30] Foreign Application Priority Data

Dec. 26, 1986 [JP] Japan .................. 61-311797
Dec. 26, 1986 [JP] Japan .................. 61-311798
Dec. 26, 1986 [JP] Japan .................. 61-311799

[51] Int. Cl.$^5$ .................. C08C 45/00; C08L 9/00
[52] U.S. Cl. .................. 525/216; 525/191; 525/211
[58] Field of Search .......... 525/211, 216, 185, 332.1, 525/191; 526/283, 290, 307.8, 308, 238.3

[56] References Cited

U.S. PATENT DOCUMENTS 4,129,557 12/1978 Kudo et al. .................. 526/308 X
4,785,071 11/1988 Kondo et al. .................. 525/216 X

FOREIGN PATENT DOCUMENTS 51-87555 7/1976 Japan .................. 526/290
46-21897 6/1977 Japan .................. 526/290

OTHER PUBLICATIONS

Hackh's Chemical Dictionary, 4th ed., J. Grant (ed.), McGraw-Hill Inc. N.Y., 248 (1969).

Primary Examiner—Fred Teskin
Attorney, Agent, or Firm—Bruce L. Adams; Van C. Wilks

[57] ABSTRACT

Rubber compositions are disclosed which are comprised of a selected rubber made up of ethylene and an α-olefin and/or an unconjugated diene, and specified amounts of one or more cyclopentadiene resins. The resins are derived by copolymerizing (1) component A with component B, component A being either one or both of a conjugated double bond-containing compound and its Diels-Alder adduct and represented by the formula

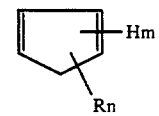

where H is hydrogen, R is $C_{1-3}$ alkyl, m and n each are 0-6, and the sum of m and n is 6, and component B being a component having a carbon double bond and a benzene nucleus, (2) component A with component C having a selected polar group and a carbon double bond, (3) a homopolymer of component A with component C, and (4) component A with component D having one or more selected phenols and their alkyl-substituted derivatives. The resulting composition is highly retentive and tacky on roll mills in an unvulcanized state.

5 Claims, No Drawings

RUBBER COMPOSITION

TECHNICAL FIELD

This invention relates to rubber compositions comprising rubbery polymers made up of ethylene and α-olefins and/or unconjugated dienes hereunder referred to typically as "EP" type rubbers, and selected cyclopentadiene resins. Such type of composition has improved roll retention and tack strength characteristics in an unvulcanized state, thus ensuring adequate processability and excellent quality of the EP rubber prior to and after vulcanization.

BACKGROUND ART

EP type rubbers, because of their superior resistance to ozone, to weathering and to heat, find extensive application to automotive parts, building components, industrial rubber products and the like. However, these rubbers tend to suffer from reduced roll retention and decreased tackiness prior to vulcanization, giving rise to processing problems.

By the term roll retention is meant the ability of an EP type rubber to adhere to the surface of a roll mill while being blended with additives. Insufficient roll retention contributes to laborious, time-consuming blending operation.

Tackiness is an adhesive property by which a rubber is bonded under mild pressure to a mating rubber or to a different material. Automobile tires and tubes are generally formed for instance by bonding rubber/rubber laminates into a desired shape which is subsequently vulcanized. Rubber laminates of poor tack strength are difficult to vulcanize while retaining the desired shape, and the resulting vulcanizate is susceptible to delamination.

To cope with these problems, a variety of tackifiers and processing aids have been proposed but with little success. Cumarone resins, terpene resins and aliphatic petroleum resins in common use as tackifiers would show no appreciable rise in tack strength. Extender oils if added in large amounts may improve tackiness to some extent, but would result in a vulcanizate being physically weak. Still much thus remains to be desired despite many attempts made with other tackifiers as disclosed for instance in Japanese Patent Publication No. 46-21897 and Japanese Patent Laid-Open Publication No. 51-87555.

The present invention seeks to provide an improved rubber composition which excels in roll retention and tack strength.

DISCLOSURE OF THE INVENTION

Through extensive research leading to the invention, the present inventors have discovered that rubber compositions of enhanced roll retention and tack strength characteristics can be obtained by the use of EP type rubbers combined with a selected class of cyclopentadiene resins.

According to the invention, there is provided a rubber composition comprising 100 parts by weight of a rubber made up of ethylene and an α-olefin and/or an unconjugated diene, and 0.5-30 parts by weight of at least one of the following polycyclopentadienes: (a) a cyclopentadiene resin derived by copolymerizing 100 parts by weight of a first component with 5-200 parts by weight of a second component, the first component being either one or both of a 5-membered, conjugated double bond-containing compound and its Diels-Alder adduct and represented by the formula

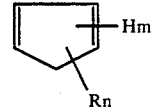

where H is a hydrogen atom, R is a $C_{1-3}$ alkyl group, m and n each are 0-6, and the sum of m and n is 6, and the second component being an unsaturated aromatic component having in the molecule a carbon double bond and a benzene nucleus; (b) a polar group-containing cyclopentadiene resin formed by copolymerizing 100 parts by weight of the first component with 1-200 parts by weight of a third component which is a compound having a polar group and a carbon double bond, the polar group being a hydroxyl, carboxyl, carboxylic anhydride, ester, nitrile or amide group; (c) a polar group-containing cyclopentadiene resin obtained by reacting 100 parts by weight of a polymer resulting from the homopolymerization of the first component with 1-200 parts by weight of the third component; and (d) a phenolic hydroxyl group-containing cyclopentadiene resin prepared by copolymerizing 100 parts by weight of the first component with 2-200 parts by weight of a fourth component which is one or more monohydric or polyhydric alcohols and their alkyl-substituted derivatives.

BEST MODE OF CARRYING OUT THE INVENTION

Starting EP type rubbers eligible for the purpose of the present invention include copolymer rubbers resulting for instance from the copolymerization of ethylene and a different α-olefin or from the terpolymerization of both α-olefins and an unconjugated diene in the presence of a known Ziegler-Natta catalyst.

α-Olefins used herein are comonomers having a carbon number of 3-5, and they include for example propylene, 1-butene, 1-pentene and the like among which propylene is most preferred.

Suitable unconjugated diene comonomers may be selected for example from dicyclopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1-butenyl)-2-norbornene, cyclooctadiene, vinylcyclohexene, 1,5,9-cyclododecatriene, 6-methyl-4,7,8,9-tetrahydroindene, 2,2'-dicyclopentenyltrans-1,2-divinylcyclobutane, 1,4-hexadiene, 2-methy-1,4-hexadiene, 1,6-octadiene, 1,7-octadiene, 1,8-nonadiene, 1,9-decadiene, 3,6-dimethy-1,7-octadiene, 4,5-dimethyl-1,7-octadiene, 1,4,7-octatriene, 5-methyl-1,8-nonadiene and the like. These dienes may be used alone or in combination. Particularly preferred are 5-ethylidene-2-norbornene, dicyclopentadiene and their blend.

EP type rubbers representative of the invention are generally made up of 48-80% by mol of ethylene, 50-20% by mol of an α-olefin and 1-10% by mol of an unconjugated diene. This starting rubber has a Mooney viscosity ($ML_{1+4}$, 100° C.) of not smaller than 20, preferably greater than 50.

Eligible cyclopentadiene resins I may be derived by copolymerizing 100 parts of a first component (component A) with 5-200 parts, preferably 10-180 parts, of a second component (component B) in the absence of a catalyst but with heat. All parts are by weight based on 100 parts by weight of a given starting rubber. Component A, directed to either one or both of a 5-membered, conjugated double bond-containing compound and its Diels-Alder adduct, is represented by the formula

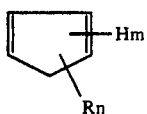

where H is a hydrogen atom, R is a $C_{1-3}$ alkyl group, m and n each are 0-6, and the sum of m and n is 6. Component B is an unsaturated aromatic hydrocarbon having in the molecule a carbon double bond and a benzene nucleus. Reaction may be effected at from 150° to 300° C., preferably 200° to 280° C., for from 20 minutes to 15 hours, preferably 1 to 10 hours.

Components A and B may be copolymerized in the presence of an aromatic hydrocarbon solvent such as benzene, toluene, xylene or the like, the amounts of their addition being in the range of 5-200 parts. Upon completion of the reaction, the solvent is removed as by distillation. Unreacted monomers and low polymers may also be removed when desired.

In the production of resin I, component B if added in amounts smaller than 5 parts would lead to reduced roll retention and if larger than 200 parts would result in deteriorated vulcanizate quality.

Resin I should preferably range in softening point from 50° to 180° C., preferably 60° to 160° C., as determined by the ball method, JIS K-2531-60. Lower softening points than 50° C. would produce a vulcanizate which is being inadequate in tensile strength and in other important qualities and further render such resin susceptible to blocking and hence difficult to knead. Higher softening points than 180° C. would fail to give uniform dispersion of the resin in a given starting rubber.

While components A and B are cation-polymerizable with use of a Friedel-Crafts catalyst such as boron trifluoride, the resulting copolymer has been found unacceptable with respect to roll retention.

Typical examples of component A include cyclopentadiene, methyl cyclopentadiene and the like, and their Diels-Alder adducts such as dicyclopentadiene, cyclopentadiene/methyl cyclopentadiene codimer, tricyclopentadiene and the like. These compounds may be used singly or in combination. Particularly preferred are cylopentadiene, dicyclopentadiene and their admixture.

In the practice of the invention, cyclopentadiene, dicyclopentadiene and their alkyl-substituted derivatives need not be highly pure, but should preferably be in a content greater than 80 wt. %. Those concentrated fractions are also useful which are obtainable by thermally dimerizing cyclopentadiene and methyl cyclopentadiene present in $C_5$ fractions byproduced upon thermal cracking of naphtha, thereby providing an admixture of dicyclopentadiene, dimethyl cyclopentadiene and cyclopentadiene/methyl cyclopentadiene codimer, and subsequently by distilling the admixture to remove $C_5$ fractions such as $C_5$ olefins and $C_5$ paraffins and other side products.

Typical examples of component B include styrene, vinyl toluene, α-methyl styrene, indene, methyl indene and the like, and their combinations. In addition to these aromatic hydrocarbons, $C_5$ fractions may suitably be employed which are unsaturated aromatics-containing fractions byproduced upon thermal cracking of naphtha and boiling at from 140° to 280° C.

Polar group-containing cyclopentadiene resins II suitable for the invention may be prepared from uncatalyzed copolymerization of 100 parts of component A with 1-200 parts, preferably 2-150 parts, of a third component (component C). Component C is a compound having a polar group and a carbon double bond, the polar group being a hydroxyl, carboxyl, carboxylic anhydride, ester, nitrile or amide group, and the double bond being ethylenic and different from a carbon-carbon linkage attached to a benzene nucleus.

Suitable polar group-containing cyclopentadiene resins III may be obtained by reacting 100 parts of a polymer resulting from homopolymerization of component A with 1-200 parts, preferably 2-150 parts, of component C.

In the formation of resins II and III, component C if less than 1 part would not be conducive to improved roll retention and if more than 200 parts would require prolonged vulcanization time.

Uncatalyzed copolymerization conditions of components A and C are from 150° to 300° C., preferably 200° to 280° C., and from 10 minutes to 20 hours, preferably 1 to 10 hours. Further, the homopolymerization of component A may be effected at from 150° to 300° C., preferably 200° to 280° C., for from 10 minutes to 20 hours, preferably 1 to 10 hours. The resulting homopolymer is thereafter allowed to react with component C at from 100° to 300° C., preferably 150° to 250° C., for from 10 minutes to 20 hours, preferably 1 to 10 hours.

Certain solvents may be used to copolymerize components A and B and to homopolymerize component A. These solvents are aromatic hydrocarbons such as benzene, toluene, xylene and the like, their amount being in the range of 5-100 parts. The reaction mixture is in either instance distilled to remove the solvent and, if necessary, unreacted monomers and low polymers. A homopolymer of component A may conveniently be reacted with component C particularly where the latter component is maleic anhydride.

Examples of component C are $C_{3-12}$ compounds having a hydroxyl, carboxyl, carboxylic anhydride, ester, nitrile or amide group and a carbon double bond. Hydroxyl-containing compounds include monohydric or polyhydric unsaturated alcohols such as allyl alcohol, butene diol, crotyl alcohol, hexene diol and the like, whereas carboxyl-containing compounds include unsaturated acids such as acrylic acid, methacrylic acid, crotonic acid, maleic acid, itaconic acid and the like. Carboxylic anhydride-containing compounds include acid anhydrides such as maleic anhydride, itaconic anhydride and the like. Ester-containing compounds include synthetic unsaturated esters such as vinyl acetate, vinyl propionate, methyl acrylate, methyl propionate, methyl methacrylate, ethyl acrylate, butyl acetate and the like, and naturally occurring unsaturated esters such as linseed oil, tung oil and the like. Nitrile-containing compounds include nitriles such as acrylonitrile, methacrylonitrile, croton nitrile and the like. Amide-containing compounds include acid amides such as acrylic amide, methacrylic amide and the like.

Eligible phenolic hydroxyl group-containing cyclopentadiene resins IV may be formed from uncatalyzed copolymerization of 100 parts of component A with 2-200 parts, preferably 5-150 parts, of a fourth component (component D). Component D is one or more monohydric or polyhydric phenols and their alkyl-substituted derivatives. Reaction conditions are from 150° to 300° C., preferably 200° to 280° C., and 10 minutes to 20 hours, preferably 1 to 10 hours. Any one aromatic hydrocarbon solvent is employed which is benzene, toluene, xylene or the like, but in an amount of from 5 to 200 parts. The reaction mixture is treated as by distillation so as to remove the solvent and unreacted monomers and low polymers if necessary.

Component D if used in less than 2 parts in preparing resin IV would lead to insufficient roll retention and if larger than 200 parts would induce too long vulcanization time to provide acceptable product.

Component D is at least one compound of the group selected from monohydric and polyhydric phenols and their alkyl-substituted derivatives having one to three $C_{1-12}$ alkyl groups substituted. Typical examples include monohydric phenols such as phenol, cresol, ethyl phenol, propyl phenol, butyl phenol, tert-butyl phenol, amyl phenol, hexyl phenol, octyl phenol, nonyl phenol, dodecyl phenol and the like, and polyhydric phenols such as hydroquinone, resorcin, catechol, bisphenol and the like. Component D contributes greatly to improved roll retention and tack strength qualities.

The softening point of resin IV should be between 50° and 180° C., preferably 60° and 160° C., as measured in accordance with JIS K-2531-60. Departures from the above specified range would pose similar problems as noted in connection with resin I.

The amount of the polycyclopentadiene to be added should be in the range of 0.5-30 parts, preferably 2-20 parts, based on 100 parts of a given EP type rubber. Smaller amounts than 0.5 part would not be effective for improving roll retention and tack strength, whereas larger amounts than 30 parts would invite prolonged vulcanization and thus result in reduced tensile stress.

There may be employed various other additives including reinforcing fillers, vulcanizing agents, vulcanizing accelerators, vulcanizing activators, softeners, antioxidants and the like. Known tackifiers such as cumarone resins, terpene resins and phenol resins may also be added but in amounts not exceeding the specified range of polycyclopentadiene and also in amounts smaller than 30 parts as the polycyclopentadiene plus tackifier sum per 100 parts of a starting rubber.

Certain corubbers may be incorporated which are selected from natural rubber, styrene/butadiene rubber, butyl rubber, chlorinated butyl rubber, brominated butyl rubber, butadiene/acrylonitrile rubber and similar rubbers, their amount being not more than equivalent starting rubber. Too much corubber is prone to adversely affect the weathering and thermal resistance peculiar to the EP type rubber.

The rubber compositions of the invention may be obtained by roll-milling or Banbury-mixing a given EP type rubber with one or more selected polycyclopentadienes.

EXAMPLES

The following examples are given to further illustrate the present invention, but should not be regarded as limiting the invention.

SYNTHESIS 1

In a 2-liter autoclave were placed 400 g of 97% purity dicyclopentadiene, 300 g of styrene and 300 g of mixed xylene. The mixture was reacted with stirring in a nitrogen atmosphere at 260° C. for 3 hours after which the autoclave was cooled. The resulting copolymerizate was distilled to remove unreacted monomers, low polymers and xylene, thereby providing 636 g of a cyclopentadiene resin according to the invention, i.e. Resin A having a softening point of 96.0° C.

SYNTHESIS 2

An autoclave equipped with a stirrer was charged with 420 g of 96% purity dicyclopentadiene, 280 g of an aromatic fraction byproduced upon thermal cracking of naphtha and boiling at from 140° to 280° C. and 300 g of commercially available mixed xylene. Copolymerization was effected at 260° C. for 2 hours. The copolymer was treated as per Synthesis 1 to thereby provide 512 g of Resin B having a softening point of 86.5° C.

COMPARATIVE SYNTHESIS 1

Into an autoclave were put 500 g of 96% purity dicyclopentadiene and 500 g of mixed xylene, followed by polymerization of the mixture at 260° C. for 2 hours and by subsequent treatment of the polymer in a similar manner. There was obtained 363 g of a comparative resin labeled Resin C and having a softening point of 93° C.

COMPARATIVE SYNTHESIS 2

A three-necked flask equipped with a stirrer was charged with 343 g of 96% purity dicyclopentadiene, 257 g of styrene and 300 g of commercially available mixed xylene. To the mixture cooled at 0° C. was slowly added 12 g of a boron trifluoride/phenol complex, followed by copolymerization at 40° C. for 3 hours. The copolymer after being neutralized with an alkali and washed with water was distilled to remove unreacted monomers, low polymers and xylene, thereby giving Resin D. This resin showed a softening point of 99.0° C.

EXAMPLES 1-2 AND COMPARATIVE EXAMPLES 1-5

Different rubber compositions were formulated and produced as shown in Table 1. All the compositions were roll-milled at 120° C. into unvulcanized rubber sheets. Cumarone and terpene resins were used as controls.

Roll retention, tack strength, vulcanization speed, hardness, 300% modulus and thermal stability under the conditions described later and with the results given in Table 1.

SYNTHESIS 3

560 g of 96% purity dicyclopentadiene was copolymerized with 140 g of vinyl acetate in the presence of 300 g of mixed xylene at 260° C. for 2.5 hours in an autoclave. The copolymer was distilled to remove unreacted monomers, low polymers and xylene, thereby providing 549 g of Resin E according to the invention. This resin had a softening point of 101.5° C. IR spectrometry showed that Resin E was abundant in ester group.

SYNTHESIS 4

525 g of 96% purity dicyclopentadiene was reacted with 175 g of methyl methacrylate in 300 g of mixed xylene at 260° C. for 2 hours in an autoclave, followed by treatment in a manner similar to Synthesis 3. There was obtained 532 g of Resin F having a softening point of 105.5° C. IR spectrometry indicated that this resin contained ester linkages.

SYNTHESIS 5

An autoclave was charged with 490 g of dicyclopentadiene, 210 g of allyl alcohol and 300 g of mixed xylene. Copolymerization was effected at 260° C. for 4 hours, followed by treatment in a similar manner after which there was obtained 527 go of Resin G. This resin showed a softening point of 88.0° C. and a hydroxyl number of 210 (mgKOH/g).

SYNTHESIS 6

500 g of dicyclopentadiene was reacted in 500 g of mixed xylene at 260° C. for 1.5 hours and thereafter treated in a similar manner to thereby give 358 g of a polymer having a softening point of 89.5° C. After being molten at 200° C., the polymer was reacted with 11.0 g of maleic anhydride for 2 hours, thereby providing Resin H. This resin had a softening point of 106.0° C. and a hydroxyl number of 15.4 (mgKOH/g).

SYNTHESIS 7

A mixture of 672 g of dicyclopentadiene, 28 g of maleic anhydride and 300 g of mixed xylene was copolymerized in an autoclave at 260° C. for 2 hours. Subsequent treatment of the copolymer in a similar manner gave 536 g of Resin I having a softening point of 109.5 g and an acid number of 16.8 (mgKOH/g).

SYNTHESIS 8

630 g of dicyclopentadiene was copolymerized with 70 g of acrylic acid in 300 g of mixed xylene at 260° C. for 2 hours in an autoclave, followed by treatment of the copolymer in a similar manner. There was obtained 561 g of Resin J having a softening point of 107.0° C. and an acid number of 10.1 (mgKOH/g).

SYNTHESIS 9

560 g of dicyclopentadiene, 140 g of acrylonitrile and 300 g of mixed xylene were put into an autoclave. Copolymerization was effected at 260° C. for 2 hours, followed by treatment in a similar manner, giving 512 g of Resin K having a softening point of 105.5° C. IR spectrometry revealed a nitrile group chemically bonded to this resin.

EXAMPLES 3-9

As shown in Table 2, different rubber compositions were also formulated and prepared. All the compositions were processed and examined for their physical characteristics as were in the previous Examples with the results given in Table 2.

SYNTHESIS 10

A mixture of 409 g of 96% purity dicyclopentadiene, 291 g of phenol and 300 g of mixed xylene was copolymerized with stirring in an autoclave at 260° C for 6 hours. The copolymer was distilled to remove unreacted monomers, low polymers and xylene, thereby obtaining 521 g of Resin L according to the invention. This resin showed a softening point of 104.5° C. and a hydroxyl number of 137 (mgKOH/g).

SYNTHESIS 11

495 g of 96% purity dicyclopentadiene was copolymerized with 541 g of mixed cresol at 265° C for 6 hours in an autoclave. The copolymer was treated in a manner similar to Synthesis 10 to thereby give 722 g of Resin M having a softening point of 91° C. and a hydroxyl number of 151 (mgKOH/g).

SYNTHESIS 12

To 503 g of 95% purity dicyclopentadiene were added 197 g of mixed cresol and 300 g of mixed xylene in an autoclave. The mixture was copolymerized at 265° C. for 2 hours, followed by treatment of the copolymer in a similar manner. There was obtained 509 g of Resin N having a softening point of 105.5° C. and a hydroxyl number of 81.5 (mgKOH/g).

SYNTHESIS 13

A $C_5$ fraction byproduced upon steam cracking of naphtha and boiling at from 28° to 60° C. was heated at 120° C. for 4 hours, followed by removal of $C_5$ olefins and $C_5$ paraffins by distillation, whereupon there was obtained a residue containing 85% of dicyclopentadiene and 10% of cyclopentadiene. To 332 g of the resulting residue were added 378 g of mixed cresoland 300 g of mixed xylene in an autoclave. Copolymerization was effected at 280° C. for 8 hours, followed by treatment in a similar manner, providing 480 g of Resin O. This resin showed a softening point of 91° C. and a hydroxyl number of 151 (mgKOH/g).

SYNTHESIS 14

Into an autoclave were taken 439 go of 96% purity dicyclopentadiene, 124 g of an aromatic fraction byproduced upon thermal cracking of naphtha and boiling at from 140° to 280° C., 199 g of phenol and 238 g of mixed xylene. Reaction was effected at 265° C. for 8 hours. The resulting copolymer was treated in a similar manner to give 597 g of Resin P having a softening point of 98.5 g and a hydroxyl number of 92.4 (mgKOH/g).

EXAMPLES 10-14

Different rubber compositions were prepared as shown in Table 3. The procedures of the previous Examples were followed to process these compositions and to examine their physical characteristics with the results given in Table 3.

ROLL RETENTION

Adhesion of a test composition onto a roll mill was visually inspected while in kneading. Roll retention was graded as follows:
x: bad
Δ: poor
◯: good

TACK STRENGTH

Measurement was made under conditions of temperature: 25° C., load: 500 g, contact time: 30 seconds and peel speed: 100 mm/minute with use of a tester tradenamed Picmaster, Toyo Seiki Seisakusho, Ltd.

VULCANIZATION SPEED

A tester tradenamed Oscillating Disc Rheometer, Toyo Seiki Seisakusho, Ltds. was used at a vulcanization temperature of 160° C. Speed was determined by the difference between $t_{10}$ and $t_{90}$:
$t_{10}$: time required for maximum torque to reach 10% (second)
$t_{90}$: time required for maximum torque to reach 90% (second)

HARDNESS

Shore A hardness was measured in accordance with JIS K-6301.

300% MODULUS

JIS K-6301 was followed using No. 3 dumbell.

THERMAL STABILITY

The vulcanizate was disposed at 150° C. for 3 days after which 300% modulus was measured. Stability was determined in terms of the ratio of moduli at 300% prior to and after heating.

INDUSTRIAL FEASIBILITY

As appears clear from Table 1-3, the rubber compositions according to the invention, comprised essentially of EP type rubbers and selected cyclopentadiene resins, have proved quite satisfactory in respect of roll retention and tack strength in an unvulcanized state without involving prolonged vulcanization time and reduced product quality after vulcanization.

TABLE 1

| Formulations (part by weight) | Examples 1 | Examples 2 | Comparative Examples 1 | Comparative Examples 2 | Comparative Examples 3 | Comparative Examples 4 | Comparative Examples 5 |
|---|---|---|---|---|---|---|---|
| EP rubber*1) | 140 | 140 | 140 | 140 | 140 | 140 | 140 |
| carbon black*2) | 100 | 100 | 100 | 100 | 100 | 100 | 100 |
| zinc oxide | 3 | 3 | 3 | 3 | 3 | 3 | 3 |
| stearic acid | 2 | 2 | 2 | 2 | 2 | 2 | 2 |
| sulfur | 2.8 | 2.8 | 2.8 | 2.8 | 2.8 | 2.8 | 2.8 |
| Nocceller-CZ*3) | 4 | 4 | 4 | 4 | 4 | 4 | 4 |
| Nocceller-TT*3) | 5 | 5 | 5 | 5 | 5 | 5 | 5 |
| process oil*4) | 60 | 60 | 60 | 60 | 60 | 60 | 60 |
| Resin A | 10 | | | | | | |
| Resin B | | 10 | | | | | |
| Resin C | | | 10 | | | | |
| Resin D | | | | 10 | | | |
| control resin a*5) | | | | | 10 | | |
| control resin b*6) | | | | | | 10 | |
| roll retention | ○ | ○ | △ | △ | △ | △ | x |
| tack strength (g/13 mm) | 1120 | 1140 | 1080 | 810 | 460 | 680 | 440 |
| vulcanization speed (sec) | 270 | 260 | 265 | 270 | 280 | 290 | 270 |
| hardness | 60.5 | 60.0 | 60.5 | 61.0 | 59.0 | 59.5 | 61.5 |
| 300% modulus (kg/cm²) | 80 | 78 | 78 | 76 | 70 | 72 | 82 |
| thermal stability (%) | 98 | 96 | 98 | 93 | 88 | 90 | 98 |

Notes:
*1)EPT-3072E, Mitsui Petrochemical Industries, Ltd.
*2)Asahi Carbon No. 60, Asahi Carbon Co., Ltd.
*3)vulcanizing accelerator, Ohuchi Shinko Chemical Industries, Ltd.
*4)Komorex No. 2, Nippon Oil Co., Ltd.
*5)G-90, cumarone resin, Nittetsu Chemical Industrial Co., Ltd.
*6)YS Resin TO-105, terpene resin, Yasuhara Oils and Fats Co., Ltd.

TABLE 2

| Formulations (part by weight) | Examples 3 | 4 | 5 | 6 | 7 | 8 | 9 |
|---|---|---|---|---|---|---|---|
| EP rubber*1) | 140 | 140 | 140 | 140 | 140 | 140 | 140 |
| carbon black*2) | 100 | 100 | 100 | 100 | 100 | 100 | 100 |
| zinc oxide | 3 | 3 | 3 | 3 | 3 | 3 | 3 |
| stearic acid | 2 | 2 | 2 | 2 | 2 | 2 | 2 |
| sulfur | 2.8 | 2.8 | 2.8 | 2.8 | 2.8 | 2.8 | 2.8 |
| Nocceller-CZ*3) | 4 | 4 | 4 | 4 | 4 | 4 | 4 |
| Nocceller-TT*3) | 5 | 5 | 5 | 5 | 5 | 5 | 5 |
| process oil*4) | 60 | 60 | 60 | 60 | 60 | 60 | 60 |
| Resin E | 10 | | | | | | |
| Resin F | | 10 | | | | | |
| Resin G | | | 10 | | | | |
| Resin H | | | | 10 | | | |
| Resin I | | | | | 10 | | |
| Resin J | | | | | | 10 | |
| Resin K | | | | | | | 10 |
| roll retention | ○ | ○ | ○ | ○ | ○ | ○ | ○ |
| tack strength (g/13 mm) | 1210 | 1180 | 1310 | 1120 | 1020 | 1060 | 1110 |
| vulcanization speed (sec) | 255 | 265 | 250 | 290 | 280 | 285 | 265 |
| hardness | 61.5 | 60.0 | 60.5 | 60.0 | 60.5 | 61.0 | 61.5 |
| 300% modulus (kg/cm²) | 79 | 81 | 79 | 80 | 78 | 81 | 80 |
| thermal stability (%) | 98 | 98 | 96 | 98 | 97 | 96 | 96 |

*1)-*4)see notes to Table 1

TABLE 3

| Formulations (part by weight) | Examples 10 | 11 | 12 | 13 | 14 |
|---|---|---|---|---|---|
| EP rubber*1) | 140 | 140 | 140 | 140 | 140 |
| carbon black*2) | 100 | 100 | 100 | 100 | 100 |
| zinc oxide | 3 | 3 | 3 | 3 | 3 |
| stearic acid | 2 | 2 | 2 | 2 | 2 |
| sulfur | 2.8 | 2.8 | 2.8 | 2.8 | 2.8 |
| Nocceller-CZ*3) | 4 | 4 | 4 | 4 | 4 |
| Nocceller-TT*3) | 5 | 5 | 5 | 5 | 5 |
| process oil*4) | 60 | 60 | 60 | 60 | 60 |
| Resin L | 10 | | | | |
| Resin M | | 10 | | | |
| Resin N | | | 10 | | |
| Resin O | | | | 10 | |
| Resin P | | | | | 10 |
| roll retention | ○ | ○ | ○ | ○ | ○ |

TABLE 3-continued

| Formulations | Examples | | | | |
|---|---|---|---|---|---|
| (part by weight) | 10 | 11 | 12 | 13 | 14 |
| tack strength (g/13 mm) | 1380 | 1440 | 1330 | 1430 | 1370 |
| vulcanization speed (sec) | 255 | 260 | 250 | 265 | 255 |
| hardness | 60.0 | 61.0 | 61.5 | 61.5 | 61.0 |
| 300% modulus (kg/cm$^2$) | 80 | 78 | 81 | 79 | 80 |
| thermal stability (%) | 96 | 98 | 98 | 96 | 96 |

*[1]-*[4] see notes to Table 1

What is claimed is:

1. A rubber composition comprising 100 parts by weight of a rubber made up of ethylene and an α-olefin and/or an unconjugated diene, and 0.5-30 parts by weight of at least one of the following polycyclopentadienes;

(a) a cyclopentadiene resin derived by copolymerizing 100 parts by weight of a first component with 5-200 parts by weight of a second component, said first component being either one or both of a 5-membered, conjugated double bond-containing compound and a Diels-Alder adduct thereof, and represented by the formula

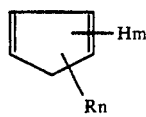

wherein H is a hydrogen atom, R is a C$_{1-3}$ alkyl group, m and n each are 0-6, and the sum of m and n is 6, and said second component being an unsaturated aromatic hydrocarbon component having in the molecule a carbon double bond and a benzene nucleus; and (b) a polar group-containing cyclopentadiene resin formed by copolymerizing 100 parts by weight of said first component with 1-200 parts by weight of a third component which is a compound having a polar group and a carbon double bond, said polar group being an ester, nitrile or amide group, wherein said ester is vinyl acetate, vinyl propionate, methyl acrylate, methyl methacrylate, ethyl acrylate, butyl acrylate, linseed oil or tung oil.

2. The composition of claim 1, wherein said third component is vinyl acetate.

3. The composition of claim 1, wherein said third component is methyl methacrylate.

4. The composition of claim 1, wherein said third component is acrylonitrile.

5. A rubber composition comprising 100 parts by weight of a rubber made up of ethylene and an α-olefin and/or an unconjugated diene, and 05.-30 parts by weight of a cyclopentadiene resin derived by copolymerizing 100 parts by weight of a first component with 5-200 parts by weight of a second component, said first component being either one or both of a 5-membered, conjugated double bond-containing compound and a Diels-Alder adduct thereof, and represented by the formula

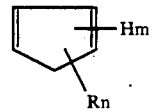

where H is a hydrogen atom, R is a C$_{1-3}$ alkyl group, m and n each are 0-6, and the sum of m and n is 6, and said second component being an unsaturated aromatic hydrocarbon component having in the molecule a carbon double bond and a benzene nucleus.

* * * * *